United States Patent

[11] 3,577,912

[72] Inventor Giovanni Busi
 Piazzale Kossut, Brescia, Italy
[21] Appl. No. 764,167
[22] Filed Oct. 1, 1968
[45] Patented May 11, 1971
[32] Priority Oct. 3, 1967
[33] Italy
[31] 814,006

[54] HORIZONTAL SCRAP METAL PRESS
 4 Claims, 6 Drawing Figs.
[52] U.S. Cl. .................................................. 100/218,
 75/44, 100/245, 100/246, 100/255, 100/295,
 292/33
[51] Int. Cl. .................................................. B30b 15/32
[50] Field of Search .................................................. 100/98,
 218, 240, 245, 246, 255, 295; 292/33; 75/44

[56] References Cited
UNITED STATES PATENTS

| | | | |
|---|---|---|---|
| 588,938 | 8/1897 | Albrecht et al. | 100/218 |
| 1,284,756 | 11/1918 | O'Donnell | (100/218UX) |
| 1,515,318 | 11/1924 | Tennenbaum et al. | (100/218UX) |
| 3,371,599 | 3/1968 | Tezuka | 100/218X |
| 3,377,946 | 4/1968 | Garland | 100/98 |

Primary Examiner—Billy J. Wilhite
Attorney—Clario Ceccon

ABSTRACT: A horizontal press is provided for forming compressed scrap metal briquettes that can be charged to electric furnace crucibles. Scrap metal is introduced into an elongated casing having a conical shape and a concave bottom. The scrap metal is compressed through the action of a fluid actuated cylinder and piston assembly.

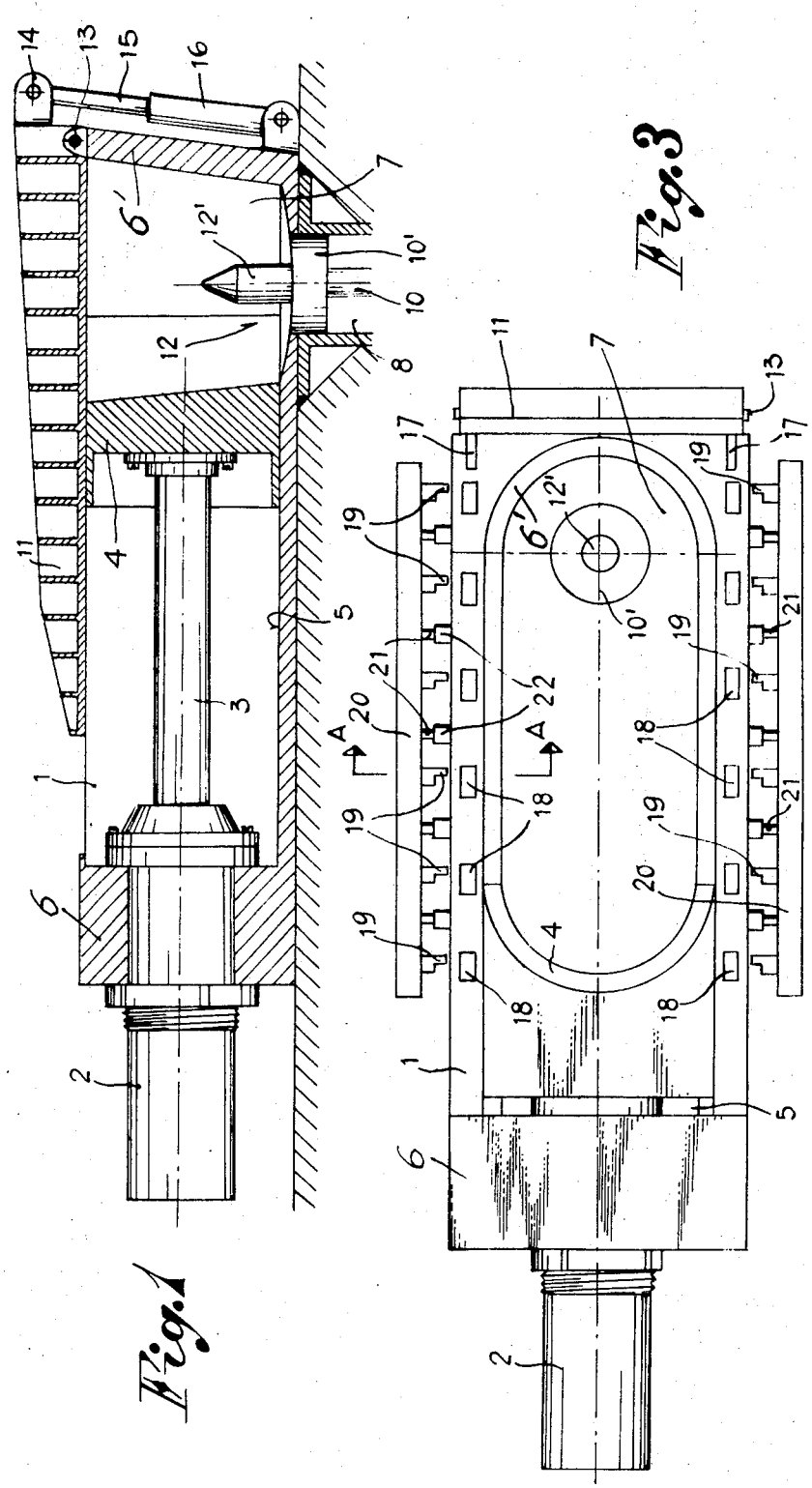

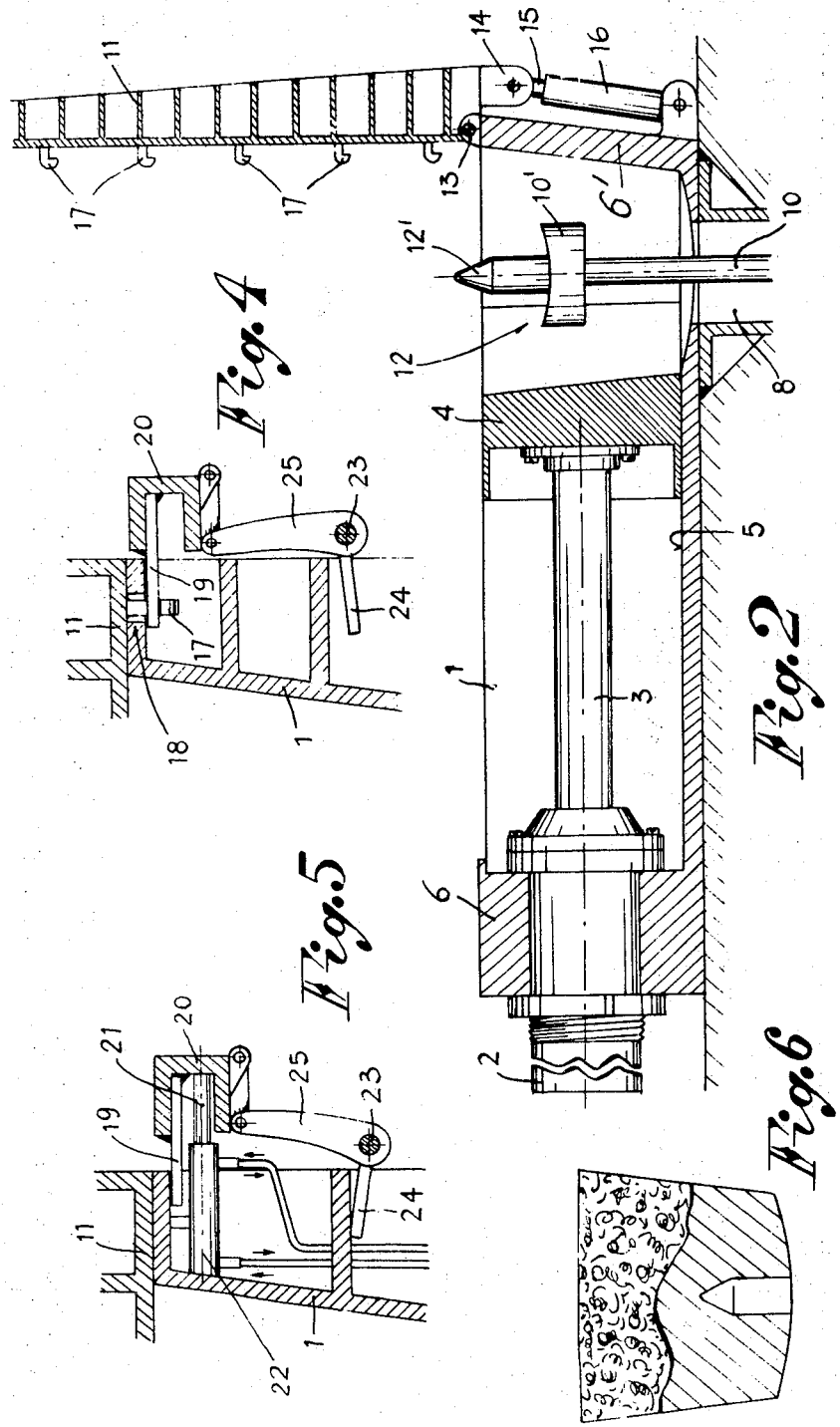

HORIZONTAL SCRAP METAL PRESS

In metallurgical works and especially in steel mills the charges of scrap metal for electric furnaces are conventionally secured by compacting a number of scrap briquettes. After having been suitably compressed the briquettes are put into the melting crucible of the furnaces.

The above-mentioned method for scrap briquetting requires much time and labor and therefore represents an appreciable expense.

It is an object of this invention to offer the means for a more suitable and fast preparation of scrap charges for electric steel furnaces and to this end a horizontal press has been designed to obtain a single iron scrap block representing an individual charge for melting furnaces. The press is substantially composed of an elongated mantle or casing fitted with a suitable top cover, one side of said casing comprising a chamber receiving the iron scrap bulk, a fluid actuated cylinder and piston assembly being arranged at the opposite side, wherein the horizontally moving piston rod is fitted with a suitably shaped end flange, said cylinder with said flanged piston achieving the requested compression of the scrap in said chamber and thus forming a single block subsequently pushed out of the press by means of a suitable ejector which may, for instance, act axially on the block thus obtained.

The main purpose of this invention is to obtain quickly and at a low cost iron scrap blocks having substantially the dimensions and shape of electric furnace crucibles so that they may be used as individual charges for said furnaces.

Referring to the enclosed drawing, which is merely indicative and by no means limitative, in which FIG. 1 and FIG. 2 are two longitudinal section views of the horizontal press of this invention, with hinged cove closed and open respectively;

FIG. 3 is a top view of the unit when the cover is in open position;

FIG. 4 and FIG. 5 are section views along line A-A on FIG. 3 showing an enlarged view of the device employed to lock the cover to the casing;

FIG. 6 is a partially sectioned view of the scrap iron block obtained;

The press is composed of a mantle or casing 1 with a vertical end wall 6 at the rear thereof bearing a cylinder 2, preferably of the oil pressure type and suitable fed, with a horizontally moving piston 3 bearing a concave end flange 4 guided on bottom 5 of casing 1 in order to define and limit with another vertical end wall 6 at the front of said mantle or casing 1 a pressure chamber 7, the capacity of said chamber depending on the position of piston 3 with shaped flange 4. On bottom 5 of said mantle or casing 1 a seat 8 is lodging and guiding a vertical piston 10 fitted with a punch 12 with tapered end 12' and bottom flange 10' as shown on FIGS. 1 and 2 on the enclosed drawing.

On top of pressure chamber 7 and of the space wherein flange 4 is shifted to and from a cover 11 is fitted to hold the scrap during their compression. A detail of great importance is the fact that pressure chamber 7 is conical and its bottom is concave, the conical and concave shape of said chamber ensuring an easy extraction of the scrap iron block obtained at the end of operation.

Said cover 11 is hinged on front wall 6' of said casing 1 and pivoting on pin 13 and it is fitted with end arms 14, on each of said arms the free end of a fluid actuated piston 15 (preferably an oil pressure operated cylinder 16) is pivoted, said cylinder being in turn pivoted on the outside of wall 6' of said casing 1.

Along the borders of the inner surface of cover 11 at least two rows of hooks 17 are arranged, one row on each side, and when said cover is closed these hooks 17 engage the corresponding slots 18 formed into the top side of longitudinal walls of said casing 1.

Across said slots and thus said hooks 17 a corresponding number of dogs fitted with end nose 19 is acting, said dogs being fitted on lateral rods 20 mounted on fluid actuated pistons 21 of double action cylinders 22, for example of the oil pressure type.

Each of said rods is also fitted with a lever 25 pivoting on a common pin 23 and fitted with a finger 24 acting against a shoulder provided on the casing to limit the lateral displacements of said rods.

With the above-described press the scrap iron to be compressed into a block is charged in bulk into pressure chamber 7 while its end flange 4 with piston 3 is shifted backward (see FIG. 3) and after closing cover 11 on said mantle or casing and locking it by mans of dogs 19 acting through hooks 17 fitted on said cover the scrap is compressed by flange 4 against the sidewalls and against the vertical front wall 6' of pressure chamber 7. At the end of this operation a compact scrap briquette is obtained featuring the shape and dimensions of chamber 7, said chamber being shaped approximately like the furnace crucible; after releasing and lifting cover 11 the scrap iron block is pushed out of the press by means of bottom piston 10 acting as an ejector with its flange 10'.

While the scrap is compressed the tapered end 12' of punch 12 of ejecting piston 10, 10' forms an axial blind hole in the middle of the scrap briquette, which will afterwards aid in the preheating of the briquette. As a matter of fact the blind hole within the block pushed out of the casing and then suitably supported will be subject to the action of the flame of a gas or oil burner, said flame penetrating into the interstices within the compressed scrap to burn out the oxygen thus obtaining both a suitable preheating and deoxidation of the material. In consequence, preheating furnaces will no longer be necessary.

As mentioned before, the scrap briquette yielded by pressure chamber 7 constitutes an individual charge for electric melting furnaces and thus a single block will be enough to charge an electric furnace, owing to the fact that the pressure chamber has been designed in accordance with the shape and dimensions of the crucibles used in electric furnaces.

I claim:

1. A horizontal press for the preparation of a single iron scrap briquette usable as an individual charge for electric furnaces, said press comprising an elongated mantle having a vertical semicircular front wall, a fluid actuated horizontal cylinder and piston assembly fitted laterally inside said mantle, the piston of said cylinder and piston assembly being fitted with a concave terminal flange to define and limit, together with the said vertical semicircular front wall of said mantle, a pressure chamber into which scrap iron to be treated is discharged in bulk, the bottom of said mantle being provided with a vertically acting piston adapted to eject the scrap iron briquette, said vertically acting piston being provided with a tapered end suitable for forming a dead hole axially extending into said briquette, said horizontal piston with said terminal flange being horizontally movable to gradually and completely compress the scrap material into a single block of the approximate shape and dimensions of a crucible as used in electric furnaces.

2. A press according to claim 1 wherein the top side of said mantle is fitted with a hinged cover closing the said pressure chamber, said cover being movable through the action of a fluid actuated piston.

3. A press according to claim 2 wherein at least two rows of hooks are located along the outer edges of said cover, said hooks lodging in slots positioned along the upper border of said mantle and being lockable in place by transverse dogs fitted on pivoting rods controlled by fluid actuated pistons, said rods being connected by means of vertical lever with a bottom pivot guiding and limiting the displacements of said rods during opening and closing of said cover.

4. A press according to claim 3 wherein said pressure chamber has a conical shape and a concave bottom.